United States Patent
Hong et al.

(10) Patent No.: US 11,127,134 B2
(45) Date of Patent: Sep. 21, 2021

(54) FILM DEFECT DETECTION METHOD AND SYSTEM

(71) Applicant: SKC CO., LTD., Gyeonggi-do (KR)

(72) Inventors: Il Taek Hong, Gyeonggi-do (KR); In Suk Oh, Gyeonggi-do (KR); Hyeon Guk Kim, Gyeonggi-do (KR); Kwang Seok Oh, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 57 days.

(21) Appl. No.: 16/589,855

(22) Filed: Oct. 1, 2019

(65) Prior Publication Data

US 2020/0104993 A1    Apr. 2, 2020

(30) Foreign Application Priority Data

Oct. 1, 2018 (KR) ................ 10-2018-0117157

(51) Int. Cl.
*G06T 7/00* (2017.01)
*G01N 21/84* (2006.01)

(52) U.S. Cl.
CPC ....... *G06T 7/0004* (2013.01); *G01N 21/8422* (2013.01); *G06T 2207/20081* (2013.01); *G06T 2207/20084* (2013.01); *G06T 2207/30116* (2013.01)

(58) Field of Classification Search
CPC ......... G06T 7/0004; G06T 2207/20084; G06T 2207/20081; G06T 2207/30116; G06T 2207/10024; G06T 7/0006; G06T 2207/30108; G01N 21/8422; G01N 2021/8909; G01N 2021/8883; G06N 3/0454; G06N 3/08
See application file for complete search history.

(56) References Cited

U.S. PATENT DOCUMENTS

| | | | | |
|---|---|---|---|---|
| 2010/0266195 | A1* | 10/2010 | Iwanaga | G06K 9/4652 382/149 |
| 2019/0139213 | A1* | 5/2019 | Kurita | G06N 20/00 |
| 2019/0213725 | A1* | 7/2019 | Liang | G06N 3/0454 |

(Continued)

FOREIGN PATENT DOCUMENTS

| | | |
|---|---|---|
| JP | 6294529 B1 | 2/2018 |
| KR | 10-2017-0086585 | 7/2017 |

(Continued)

OTHER PUBLICATIONS

Office Action issued by Korean Patent Office dated Jun. 17, 2020.
(Continued)

*Primary Examiner* — Ping Y Hsieh
(74) *Attorney, Agent, or Firm* — IP & T Group LLP (57) ABSTRACT

The present specification provides a film defect detection system. The film defect detection system may comprise an image acquisition unit configured to acquire an image of a film in a manufacturing process of the film; a defect detection unit configured to detect defects in the film by analyzing the acquired image of the film, using a machine learning algorithm learned to detect a defect in advance, when receiving the acquired image of the film; and an information output unit configured to output information on the defects in the film detected by the defect detection unit.

14 Claims, 7 Drawing Sheets

(56) References Cited

U.S. PATENT DOCUMENTS

2019/0220972 A1* 7/2019 Iwanaga .................. G06T 7/66
2020/0167656 A1* 5/2020 Trenholm .............. G06N 3/084
2020/0402225 A1* 12/2020 Iwanaga ............... G06T 7/0006

FOREIGN PATENT DOCUMENTS

KR      10-1782363 B1    9/2017
KR   10-2017-0136992 A  12/2017

OTHER PUBLICATIONS

Office Action issued by Korean Intellectual Property Office dated Dec. 16, 2019.

\* cited by examiner

| Class | Predict | Correct | Precision |
|---|---|---|---|
| M LINE | 4958 | 4813 | 97.08 |
| OTHER DEFECTS | 36996 | 33609 | 90.84 |
| BUBBLE | 821 | 683 | 83.19 |
| UNSTRETCHED | 322 | 304 | 94.41 |
| WHITENESS | 7332 | 6164 | 84.07 |
| OIL CONTAMINATION | 366 | 322 | 87.98 |
| LIQUID MIXING | 13992 | 13503 | 96.51 |
| LONGITUDINAL S/C | 3805 | 3410 | 89.62 |
| CARBIDE | 1112 | 963 | 86.6 |
| TRANSVERSE S/C | 1659 | 1394 | 84.03 |
| BLACK DEFECT | 999 | 999 | 100 |
| SUM & AVERAGE | 72362 | 66164 | 91.4% |

FILM DEFECT DETECTION METHOD AND SYSTEM

CROSS-REFERENCE TO RELATED APPLICATION

This application claims priority to Korean Patent Application No. 10-2018-0117157, filed on Oct. 1, 2018, the entire contents of which are incorporated herein by reference.

FIELD OF THE INVENTION

The present disclosure relates to a method for detecting defects in a film in the manufacturing process of the film and a system for performing the method.

BACKGROUND OF THE INVENTION

In the process of manufacturing a product, the product may have various defects. For example, in a manufacturing process of a film, bubbles may occur in the film in a casting process or tearing may occur in the film in a stretching process. The causes of such defects are very diverse, and products having defects need to be distinguished and managed separately from the final products in order to improve the quality of the products.

Typically, in order to distinguish products with defects, an operator manually checks whether a product has a defect and distinguishes the defective product. In this case, however, the judgment on the defect is dependent on the experience or condition of a person, which results in a low accuracy and a time consumption.

Meanwhile, electronic technology is being applied to various fields due to the development of technology, and research on the application of electronic technology for increasing the efficiency of the manufacturing process is also actively conducted. For example, the introduction of automation of the manufacturing process is being actively promoted, and in this respect, there is an increasing demand for automation to increase accuracy and efficiency with respect to defect detection.

SUMMARY OF THE INVENTION

In view of the above, the present disclosure provides a film defect detection method for effectively detecting film defects using a machine learning algorithm, and a system for performing the method.

In accordance with an aspect of the present disclosure, there is provided a film defect detection system. The film defect detection system comprises an image acquisition unit configured to acquire an image of a film in a manufacturing process of the film; a defect detection unit configured to detect defects in the film by analyzing the acquired image of the film, using a machine learning algorithm learned to detect a defect in advance, when receiving the acquired image of the film; and an information output unit configured to output information on the defects in the film detected by the defect detection unit.

The machine learning algorithm is learned in advance to detect at least one of types of the defects in the film, the number of the defects in the film, the number of the types of the defects in the film, and sizes of the defects in the film.

The film defect detection system further comprises an additional information acquisition unit configured to acquire a value of a parameter related to the defects in the film in the manufacturing process, wherein the machine learning algorithm is learned in advance by receiving the value of the parameter acquired by the additional information acquisition unit.

The parameter includes at least one of shapes of the defects, sizes of the defects, colors of the defects, and whether the image acquired by the image acquisition unit 210 is acquired before a stretching process of the manufacturing process.

The machine learning algorithm includes convolutional neural networks.

The image acquisition unit acquires an image of the film by using a light transmission technology.

The manufacturing process includes a plurality of steps sequentially performed, the image acquisition unit acquires an image of the film at each of a first step and a second step of the plurality of steps, the first step being performed before the second step, and the defect detection unit detects defects for each of the images acquired at the first step and the second step and classifies the acquired images by types of the defects.

The machine learning algorithm is learned by using images designated in advance for a plurality of images related to at least a part of the film, and the designated images include an image indicating at least one of defects which are to occur in the film.

In accordance with an another aspect of the present disclosure, there is provided a film defect detection method. The method comprises acquiring an image of a film in a manufacturing process of the film; detecting defects in the film by analyzing the acquired image of the film using a machine learning algorithm learned to detect a defect in advance, when receiving the acquired image of the film; and outputting information on the defect in the film detected by the defect detection unit.

The method further comprises, acquiring a value of a parameter related to the defects in the film in the manufacturing process, wherein the machine learning algorithm is learned in advance by receiving the value of the parameter acquired by the additional information acquisition unit.

According to the film defect detection method and system, it is possible to improve the accuracy of defect detection of a film by acquiring an image of the film and analyzing the acquired image using the machine learning algorithm.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, configurations and operations of embodiments will be described in detail with reference to the accompanying drawings. The following description is one of various patentable aspects of the present disclosure and may form a part of the detailed description of the present disclosure.

However, in describing the present disclosure, detailed descriptions of known configurations or functions that make the present disclosure obscure may be omitted.

The present disclosure may be modified and include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives that are included in the spirit and scope of the present disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Figure 1:
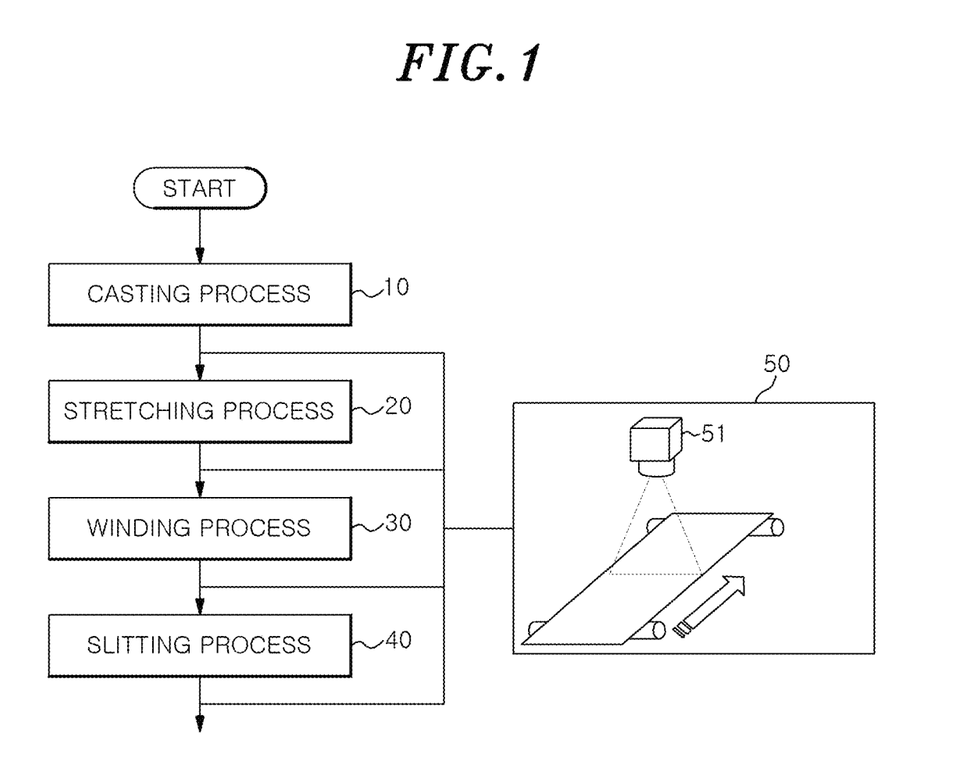
FIG. 1 is a view conceptually illustrating the steps of acquiring an image of a film in a film defect detection method according to an embodiment of the present disclosure.

FIG. 1 is a view conceptually illustrating the steps of obtaining an image of a film in a film defect detection method according to an embodiment of the present disclosure.

Referring to FIG. 1, a manufacturing process of the film includes a casting process 10, a stretching process 20, a winding process 30, and a slitting process 40. Hereinafter, the steps well known to a person skilled in the art will be omitted.

The casting process 10 includes: melting a material of the film and discharging the melted material through a die; seating polymer discharged through the die onto a casting roll; and rapidly cooling the film to form a sheet with crystallinity suitable for extension in a later process. In the casting process 10, M line, carbide, deterioration, die line, applied spot, bubble, and C/R track defects may occur.

The stretching process 20 includes stretching the unstretched sheet formed on the casting roll in at least one of a transverse direction and a longitudinal direction to increase the mechanical properties thereof.

In the stretching process 20, roll mark, stretched stain, whiteness, liquid mixing, carbide, unstretched, and oil contamination defects may occur.

The winding process 30 includes winding the stretched film into a predetermined shape, for example, a roll shape. In the winding process 30, scratch, whiteness, liquid mixing, corona pattern, and foreign material defects may occur.

The slitting process 40 includes cutting the film to a predetermined width and length. The predetermined width and length may be changed according to a user's input. In the slitting process 40, scratch, static electricity defect, and foreign material defects may occur.

As shown in FIG. 1, a film is manufactured through the casting process 10, the stretching process 20, the winding process 30, and the slitting process 40, and an image of the film can be acquired by an image acquirer 50 between the processes.

For example, before the film formed through the casting process 10 is applied to the stretching process 20, an image of the formed film may be acquired by the image acquirer 50.

In another example, before the stretched film through the stretching process 20 is applied to the winding process 30, an image of the stretched film may be acquired by the image acquirer 50.

Specifically, the image acquirer 50 acquires an image of the film passing through the image acquirer 50 using a camera 51. The image acquirer 50 may acquire an image of a film to which a light transmission technology is applied using the light transmission technology in some cases. It can be determined whether or not a defect exists in the film by using the image acquired by the image acquirer 50.

In some cases, the image acquirer 50 may acquire an image of the film at a high speed based on a method of scanning the production line of the film.

Figure 2:
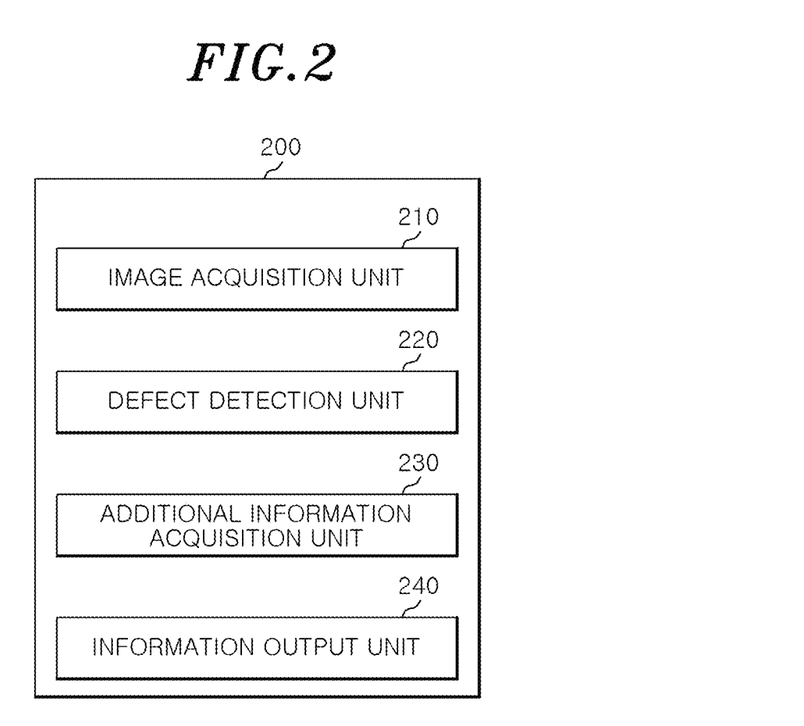
FIG. 2 is a block diagram illustrating an example of a functional configuration of a film defect detection system according to an embodiment of the present disclosure.

FIG. 2 is a block diagram illustrating an example of a functional configuration of a film defect detection system according to an embodiment of the present disclosure.

The term "unit" used below refers to a unit for processing at least one function or operation, which may be implemented by hardware or software, or a combination of hardware and software.

The film defect detection system 200 may also be referred to as a film defect detection device.

Referring to FIG. 2, the film defect detection system 200 includes an image acquisition unit 210, a defect detection unit 220, an additional information acquisition unit 230, and an information output unit 240.

The image acquisition unit 210 has a configuration corresponding to the image acquirer 50 of FIG. 1. The image acquisition unit 210 may include a camera 51, and may acquire an image of a film passing through the image acquisition unit 210 through the camera 51.

The film manufacturing process comprises a plurality of steps. For example, the film manufacturing process includes the casting process 10, the stretching process 20, the winding process 30, and the slitting process 40.

The image acquisition unit 210 acquires an image of the film at the steps of the manufacturing process of the film that are sequentially performed. In this regard, descriptions overlapping with those with respect to FIG. 1 will be omitted.

In some cases, the image acquisition unit 210 acquires an image of the film by using a light technology. The light technology is, for example, a technology that more clearly shows the shape of the film by transmitting or reflecting light onto or from the film to acquire an image of at least a part of the film, which is well known to a person skilled in the art, and thus, a detailed description thereof will be omitted. The image acquisition unit 210 provides the acquired image to the defect detection unit 220.

When receiving an image of the film from the image acquisition unit 210, the defect detection unit 220 can detect a defect in the film by analyzing the image of the film.

When receiving a plurality of images of the film from the image acquisition unit 210, the defect detection unit 220 can analyze each of the images of the film to detect defects in the films represented by the images.

In some cases, the defect detection unit 220 receives an image of the film for at least some of the steps of the manufacturing process from the image acquisition unit 210. For example, the defect detection unit 220 detects a defect for each of the input images when a plurality of images of the film is input thereto after the casting process 10 is performed and after the winding process 30 is performed, and distinguishes the type of the detected defect to classify the input images by the types of the defects.

Specifically, the defect detection unit 220 detects a defect in the film by using a machine learning algorithm learned to detect a defect in advance.

For example, the machine learning algorithm is learned in advance to detect at least one of the types of defects in the film, the number of defects in the film, the number of types of defects in the film, and the sizes of defects in the film.

The machine learning algorithm may be learned in advance to additionally receive parameters and use them for defect detection. The parameters will be described later with reference to the additional information obtaining unit 230.

The machine learning algorithm may include convolutional neural networks. The machine learning algorithm is not limited to the example of the algorithm described above, and may be configured with various algorithms capable of performing machine learning.

The additional information acquisition unit 230 acquires a value of a parameter related to a defect in the film in the manufacturing process. The parameter represents a reference value for distinguishing defects in the film. The parameter includes, for example, at least one of the shape of the defect, the size of the defect, the color of the defect, and whether the image acquired by the image acquisition unit 210 is acquired before the stretching process 20.

Meanwhile, in relation to whether the image acquired by the image acquisition unit 210 is acquired before the stretching process 20, when the film of the acquired image already contains a defect before the stretching process 20, the shape or size of the defect may be changed during the stretching process 20. Accordingly, whether the image acquired by the image acquisition unit 210 is acquired before the stretching process 20 may be used as a parameter because it may affect the accuracy of defect detection.

When the parameter value is acquired by the additional information acquisition unit 230, the machine learning algorithm of the defect detection unit 220 receives the parameter value acquired by the additional information acquisition unit 230 from the additional information acquisition unit 230 and can be learned to detect defects in the image of the film. Such learning is performed in advance before performing each step of the film defect detection method for detecting defects in the film.

The information output unit 240 outputs information about the defect. The information output unit 240 outputs the acquired information on the defect in the film from the defect detection unit 220. The information output unit 240 includes a display device and outputs information about a defect through the display device.

The information about the defect includes various information about the defects associated with the acquired image. For example, information about defects includes information about the image of the film containing the defect, information about the type of defect included in the image of the film, and information on a plurality of images of the films classified according to the types of defects.

Information on the defect displayed through the information output unit 240 will be described in more detail with reference to FIGS. 5 and 6.

Figure 3:
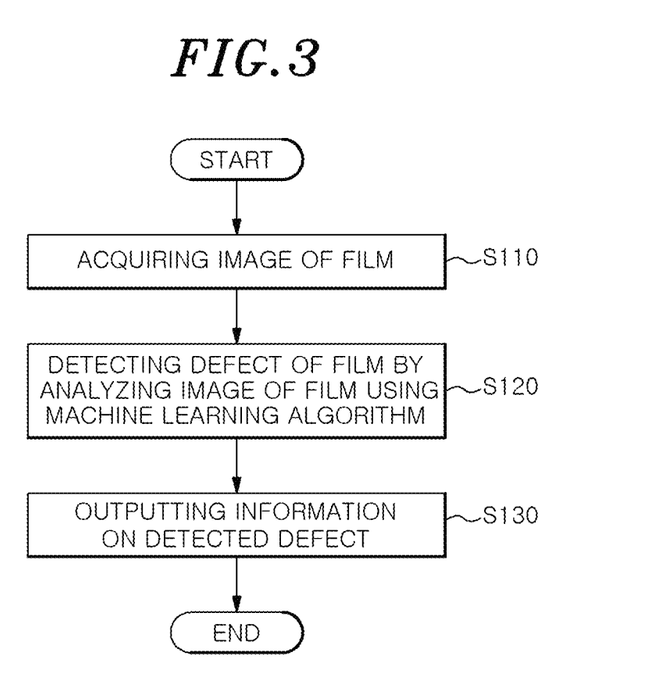
FIG. 3 is a flowchart of the film defect detection method according to the embodiment of the present disclosure.

FIG. 3 shows the flowchart of the film defect detection method according to an embodiment of the present disclosure. The steps of the method shown in FIG. 3 may be performed in a different order from that shown in the drawing in some cases Hereinafter, the flow of the steps of the film defect detection method will be described with reference to the configurations of the film defect detection system 200 of FIG. 2.

Referring to FIG. 3, the image acquisition unit 210 acquires images of a film (S110). At least some of the images of the film acquired by the image acquisition unit 210 may be an image of the film including the defect.

The defect detection unit 220 detects a defect in the film by analyzing the images of the film using a machine learning algorithm (S120). Specifically, the defect detection unit 220 determines whether the film has a defect, and when the film has a defect, the defect detection unit 220 determines the type of the defect to classify the acquired image based on the type of the defect. Meanwhile, information on the types of the defects may be stored in advance, and the defect detection unit 220 may classify the images based on the stored information.

The machine learning algorithms can be learned in advance to detect defects in the film. Spherically, the machine learning algorithms can be learned in advance to detect a defect by receiving parameter values for the defect, such as the shape of the defect, the size of the defect and the color of the defect. As the machine learning algorithms that have been learned in advance is operated, the accuracy and efficiency for detecting defects can be improved.

The defect detection unit 220 quickly and accurately detects a defect of an image of a film by using the machine learning algorithm.

The information output unit 240 outputs information on the detected defect (S130). The information output unit 240 outputs information about defects that are classified and displayed by types of defects with respect to the images of the film.

The information output unit 240 may include a display device, and in this case, information about a defect may be displayed through the display device. The display device is a device for visually providing information to a user, and includes, for example, a display, a hologram device, a projector or the like.

In case the information output unit 240 does not include a display device, the information output unit 240 may be connected to the display device, and provide information about a defect to the display device to display information about the defect through the display device.

Figure 4:
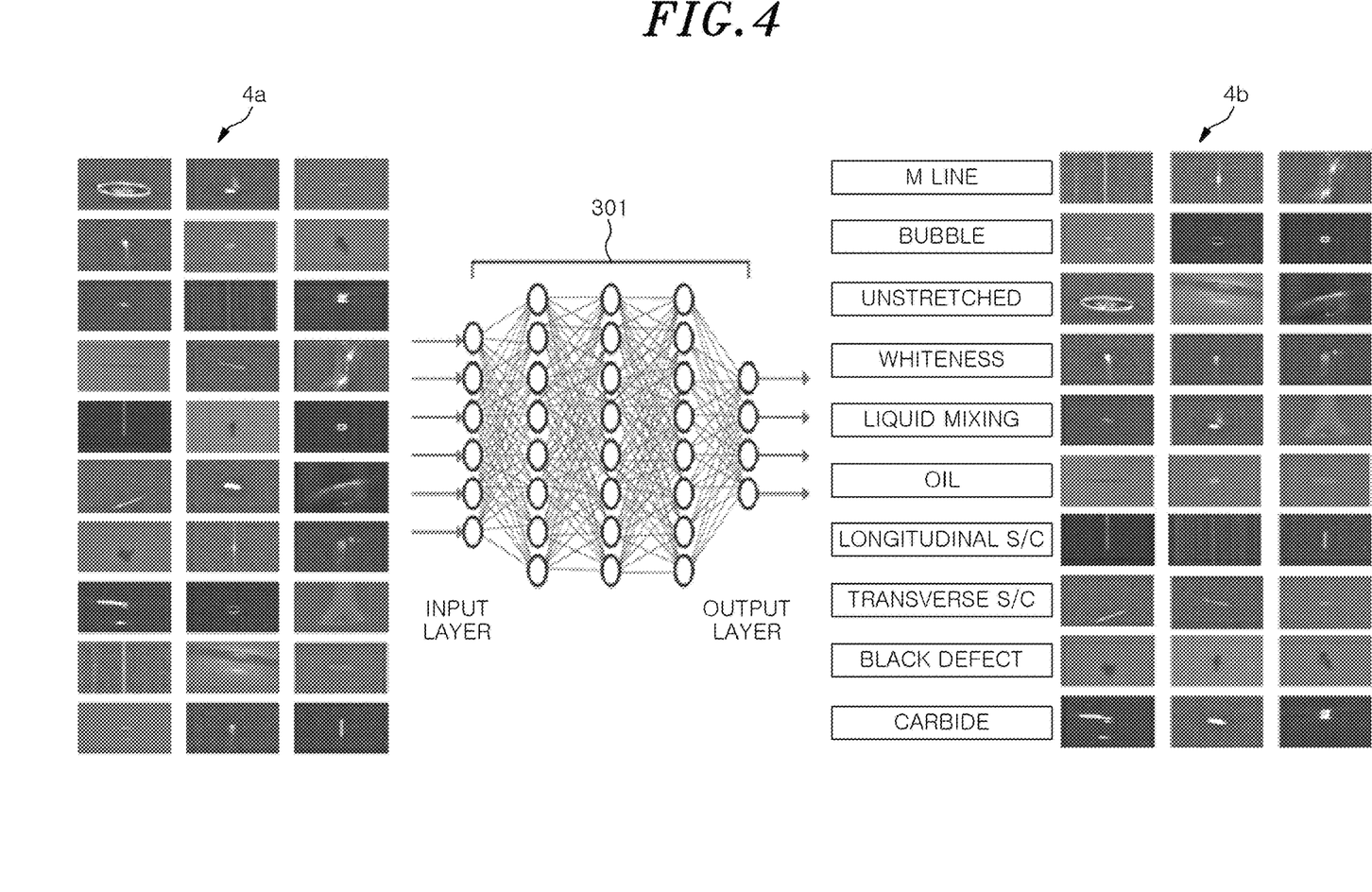
FIG. 4 shows an example in which a machine learning algorithm is used in the film defect detection method according to the embodiment of the present disclosure.

FIG. 4 shows an example in which the machine learning algorithm is used in the film defect detection method according to the embodiment of the present disclosure.

Referring to FIG. 4, the machine learning algorithm 301 receives the acquired images indicated by reference numeral 4a. According to reference numeral 4a, the input image displays images representing various defects associated with the film. The machine learning algorithm 301 analyzes the acquired images and classifies the acquired images according to the types of defects.

The images classified by the types of defects may be displayed as shown by reference numeral 4b.

According to reference numeral 4b, the defects include, for example, an M-line defect caused by a difference in state of opposite faces of the sheet, a bubble defect caused by bubbles inserted into the film, an unstretched defect caused by insufficient stretching, whiteness defects that occur when polymers vaporized at a high temperature during transverse stretching are subsequently cooled to be polymer agglomerates, deterioration of a raw material of coating liquid mixing or coating liquid mixing defects due to poor drying after application of the raw material of the coating liquid mixing, oil defects caused by contamination of oil used in manufacturing the film, longitudinal S/C defects due to errors in longitudinal stretching process, transverse S/C defects due to errors in transverse stretching process, black defects caused by insertion of a black material, and carbide defects due to insertion of a carbide. The types of defects classified by the machine learning algorithm are not limited to the examples described above, and may include various defects that may occur in the film.

Although not illustrated, in some cases, the image input to the machine learning algorithm 301 may include an image of the film containing no defect, and in this case, the machine learning algorithm 301 may distinguish the image of the film containing no defect from images containing defects.

Figure 5:
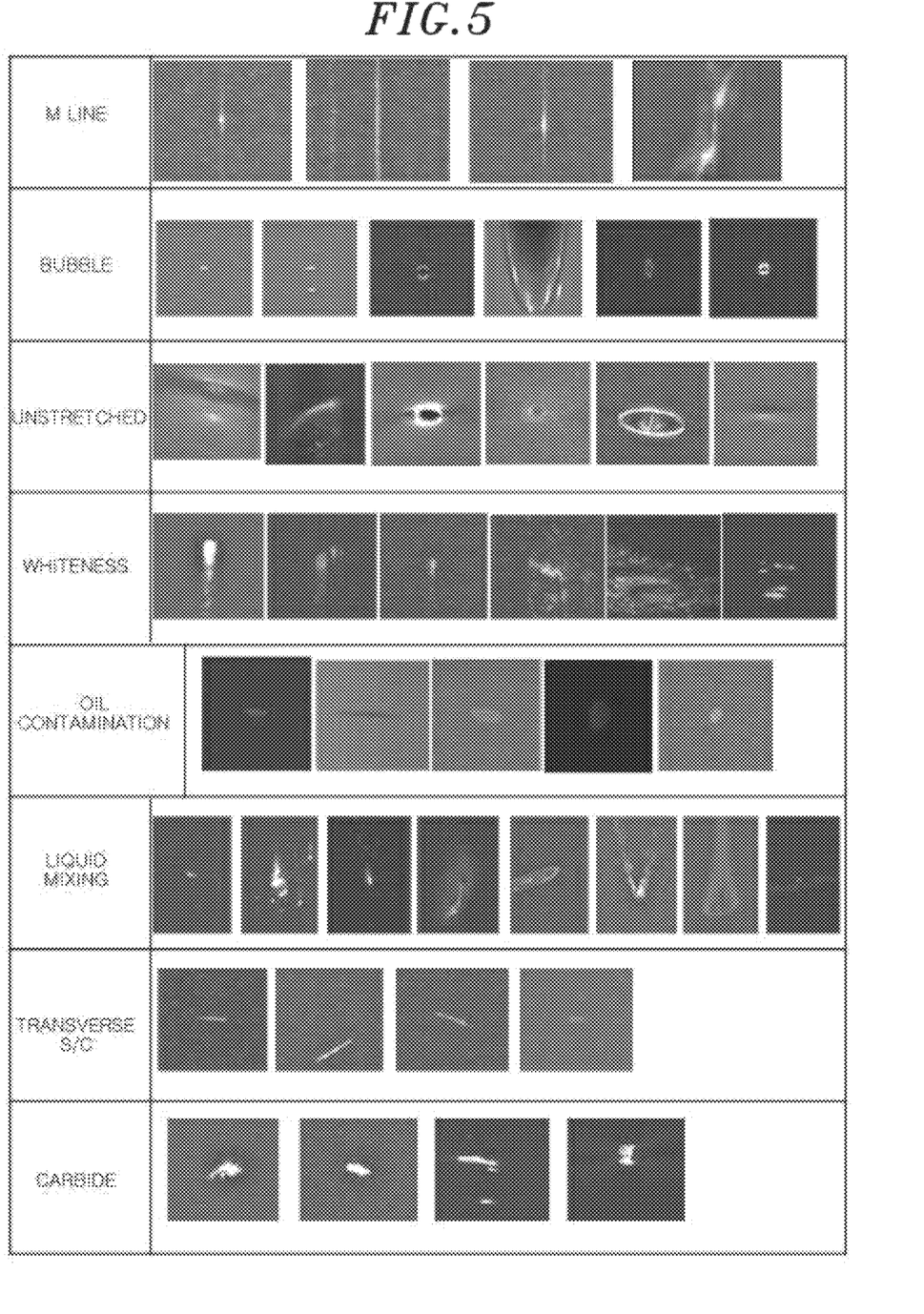
FIG. 5 shows examples of types of defects detected by the film defect detection system according to the embodiment of the present disclosure.
Figure 6:
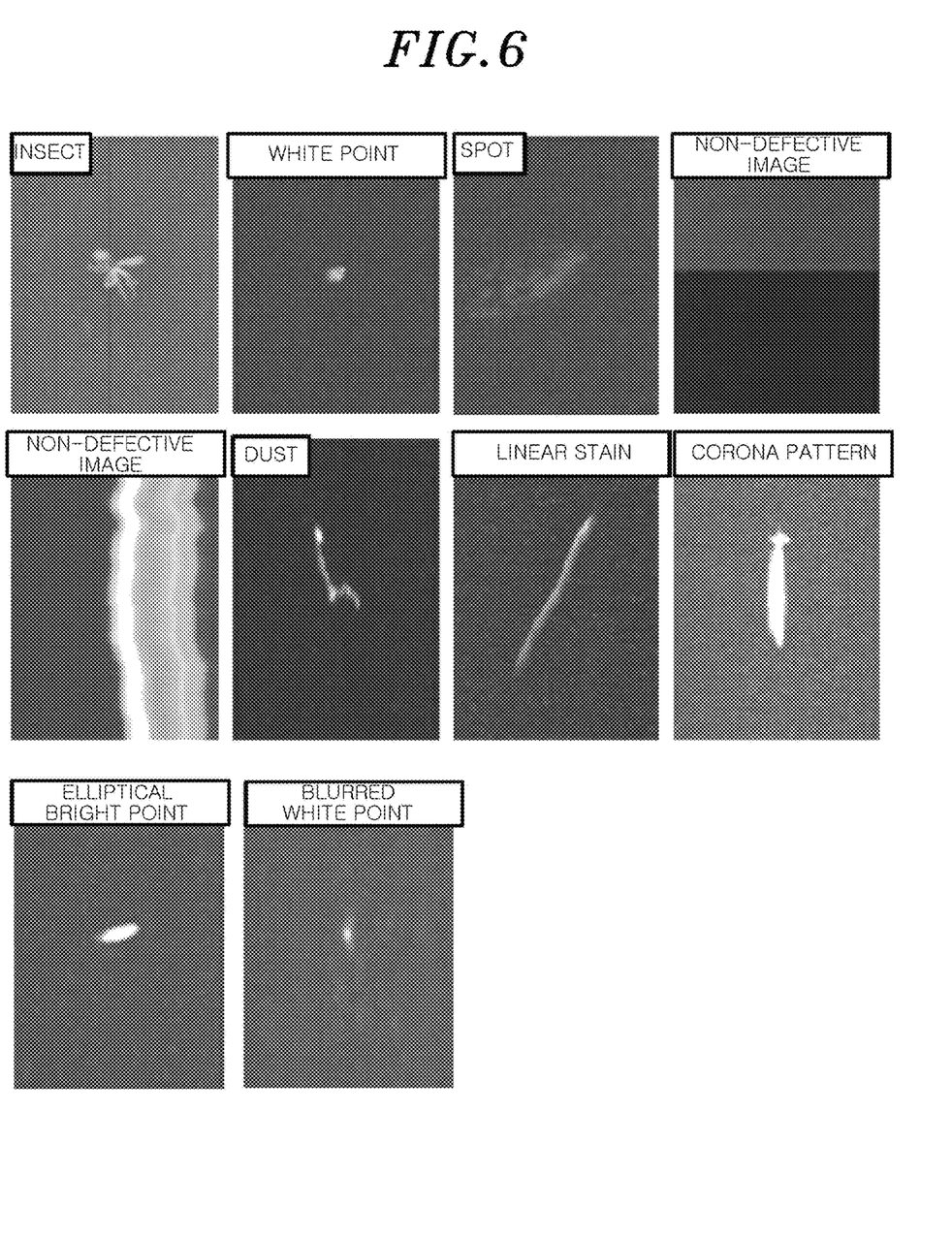
FIG. 6 shows other examples of types of defects detected by the film defect detection system according to the embodiment of the present disclosure.

FIGS. 5 and 6 show examples of types of defects detected by the film defect detection system according to the embodiment of the present disclosure.

The defect detection unit 220 detects various types of defects that may occur in the film and the defects may be displayed through the information output unit 240 as illustrated in FIG. 5 or 6. This is merely an example of the display of the information output unit 240, and the defects may be displayed variously through the information output unit without being limited thereto.

In addition, various types of defects other than the types of defects shown in FIGS. 5 and 6 may also be detected by the film defect detection system 200 without being limited to those shown in FIGS. 5 and 6.

Figure 7:
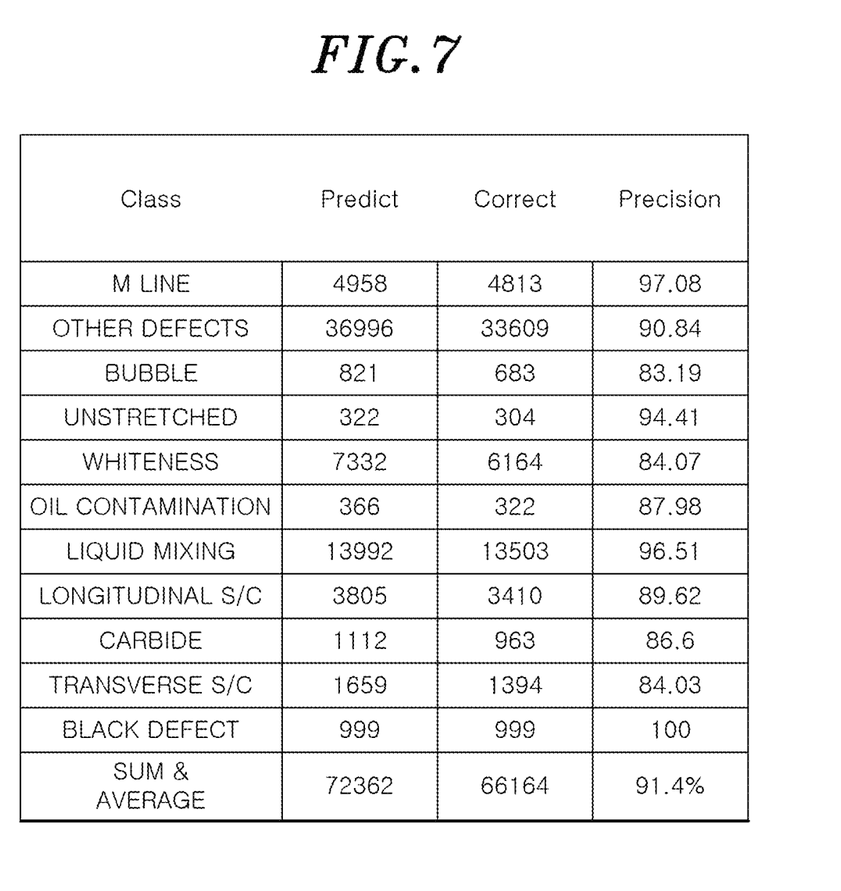
FIG. 7 shows an example of experimental results of detecting defects in a film using the film defect detection system according to the embodiment of the present disclosure.

FIG. 7 shows an example of experimental results of detecting defects in a film using the film defect detection system according to the embodiment of the present disclosure. The experimental results (e.g., accuracy) are not limited to those shown in FIG. 7, and may vary depending on the experiment.

FIG. 7 shows the expected number of films having defects for each type of the defects detected by the film defect detection system 200 and the actual number of films having defects for each type of the defects. From the result of FIG. 7, it can be seen that the film defect detection system 200 can detect defects in the film with a high probability and classify the films by types of defects with high accuracy.

Combinations of blocks in the flowcharts of the present disclosure can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the steps of the flowchart.

These computer program instructions may also be stored in a computer usable or computer readable memory that can direct a computer or other programmable data processing apparatuses to function in a particular manner, such that the instructions stored in the computer usable or computer readable medium can produce an article of manufacture including instructions which implement the function specified in the blocks of the flowcharts.

The computer program instructions may also be loaded onto a computer or other programmable data processing apparatuses to cause a series of operational steps to be performed on the computer or other programmable apparatuses to produce a computer implemented process such that the instructions which execute on the computer or other programmable apparatuses provide processes for implementing the functions specified in the blocks of the flowcharts.

Each block in the flowchart may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the present disclosure has been shown and described with respect to the embodiments, it will be understood by those skilled in the art that various changes and modifications may be made without departing from the scope of the present disclosure as defined in the following claims.

What is claimed is:

1. A film defect detection system, comprising:
   an image acquisition unit configured to acquire an image of a film in a manufacturing process of the film;
   a defect detection unit configured to detect defects in the film by analyzing the acquired image of the film, using a machine learning algorithm learned to detect a defect in advance, when receiving the acquired image of the film;
   an information output unit configured to output information on the defects in the film detected by the defect detection unit; and
   an additional information acquisition unit configured to acquire a value of a parameter related to the defects in the film in the manufacturing process,
   wherein the machine learning algorithm is learned in advance by receiving the value of the parameter acquired by the additional information acquisition unit, and
   wherein the parameter includes whether the image is acquired by the image acquisition unit before a stretching process of the manufacturing process.

2. The film defect detection system of claim 1, wherein the machine learning algorithm is learned in advance to detect at least one of types of the defects in the film, the number of the defects in the film, the number of the types of the defects in the film, and sizes of the defects in the film.

3. The film defect detection system of claim 1, wherein the parameter further includes at least one of shapes of the defects, sizes of the defects, and colors of the defects.

4. The film defect detection system of claim 1, wherein the machine learning algorithm includes convolutional neural networks.

5. The film defect detection system of claim 1, wherein the image acquisition unit acquires an image of the film by using a light transmission technology.

6. The film defect detection system of claim 1, wherein the manufacturing process includes a plurality of steps sequentially performed,
   the image acquisition unit acquires an image of the film at each of a first step and a second step of the plurality of steps, the first step being performed before the second step, and
   the defect detection unit detects defects for each of the images acquired at the first step and h second step and classifies the acquired images by types of the defects.

7. The film defect detection system of claim 1, wherein the machine learning algorithm is learned by using images designated in advance or a plurality of images related to at least a part of the film, and the designated images include an image indicating at least one of defects which are to occur in the film.

8. A film defect detection method, comprising:

acquiring a value of a parameter related to one or more defects in a film in a manufacturing process;

acquiring an image of the film in the manufacturing process of the film;

detecting the defects in the film by analyzing the acquired image of the film using a machine learning algorithm learned to detect the defects in advance, when receiving the acquired image of the film; and outputting information on the defects in the film detected by the defect detection unit, wherein the machine learning algorithm is learned in advance by receiving the value of the parameter acquired by an additional information acquisition unit, and wherein the parameter includes whether the image is acquired by the image acquisition unit before a stretching process of the manufacturing process.

9. The film defect detection method of claim 8, wherein the machine learning algorithm is learned in advance to detect at least one of types of the defects in the film, the number of the defects in the film, the number of the types of the defects in the film, and sizes of the defects in the film.

10. The film defect detection method of claim 8, wherein the parameter further includes at least one of shapes of the defects, sizes of the defects, and colors of the defects.

11. The film defect detection method of claim 8, wherein the machine learning algorithm includes convolutional neural networks.

12. The film defect detection method of claim 8, wherein the image acquisition unit acquires an image of the film by using a light transmission technology.

13. The film defect detection method of claim 8, wherein the manufacturing process includes a plurality of steps sequentially performed, the image acquisition unit acquires an image of the film at a first step and a second step of the plurality of steps, the first step being performed before the second step, and the defect detection unit detects defects for each of the images acquired in the first step and the second step and classifies the acquired images by types of the defects.

14. The film defect detection method of claim 8, wherein the machine learning algorithm includes an algorithm learned by using images designated in advance for a plurality of images related to at least a part of the film, and the designated images include an image indicating at least one of defects which are to occur in the film.

* * * * *